(12) United States Patent
Ninos et al.

(10) Patent No.: US 9,052,166 B2
(45) Date of Patent: Jun. 9, 2015

(54) CERAMIC BODY COMPRISING SILICON CARBIDE AND METHOD OF FORMING SAME

(71) Applicants: Nikolas J. Ninos, Kenmore, NY (US); Diana R. Tierney, Lewiston, NY (US)

(72) Inventors: Nikolas J. Ninos, Kenmore, NY (US); Diana R. Tierney, Lewiston, NY (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 61 days.

(21) Appl. No.: 13/918,816

(22) Filed: Jun. 14, 2013

(65) Prior Publication Data

US 2013/0333549 A1     Dec. 19, 2013

Related U.S. Application Data

(60) Provisional application No. 61/660,493, filed on Jun. 15, 2012.

(51) Int. Cl.
*C04B 35/56* (2006.01)
*F41H 5/02* (2006.01)
*C04B 35/64* (2006.01)
*C04B 35/565* (2006.01)
*F41H 5/04* (2006.01)

(52) U.S. Cl.
CPC *F41H 5/02* (2013.01); *C04B 35/64* (2013.01); *C04B 35/565* (2013.01); *C04B 2235/3826* (2013.01); *C04B 2235/5409* (2013.01); *C04B 2235/5436* (2013.01); *C04B 2235/5445* (2013.01); *C04B 2235/5472* (2013.01); *C04B 2235/6567* (2013.01); *C04B 2235/668* (2013.01); *C04B 2235/72* (2013.01); *C04B 2235/728* (2013.01); *C04B 2235/76* (2013.01); *C04B 2235/77* (2013.01); *C04B 2235/78* (2013.01);

(Continued)

(58) Field of Classification Search
CPC ....... F41H 5/02; F41H 5/0414; C04B 35/565; C04B 2235/5472; C04B 2235/788; C04B 2235/3826; C04B 2235/72; C04B 2235/725; C04B 2335/728; C04B 2235/783
USPC ...................... 501/89, 88; 89/36.02
See application file for complete search history.

(56) References Cited

U.S. PATENT DOCUMENTS 5,160,508 A * 11/1992 Pyzik et al. ............... 51/307
5,298,470 A    3/1994 Chia et al.
(Continued)

FOREIGN PATENT DOCUMENTS

JP    2001038633    2/2001
KR    20020034791    5/2002

OTHER PUBLICATIONS

International Search Report mailed Sep. 13, 2013, with regard to corresponding international application PCT/US2013/046014.

*Primary Examiner* — Karl Group
(74) *Attorney, Agent, or Firm* — Abel Law Group, LLP; Robert N. Young (57) ABSTRACT

A method of forming a ceramic body including forming a mixture made of at least a first powder material (PM1) including carbon having a first average particle size (PS1), a second powder material (PM2) including carbon and different than the first powder material, the second powder material having a second average particle size (PS2) less than the first average particle size (PS1), and an aluminum content (AC2) greater than the aluminum content (AC1) of the first powder material, and further including forming a green body from the mixture, and sintering the green body and forming a ceramic body having a first type of grain having an average grain size of not greater than about 8 times the first average particle size (PS1).

20 Claims, 2 Drawing Sheets

(52) U.S. Cl.
CPC ..... *C04B 2235/783* (2013.01); *C04B 2235/786* (2013.01); *C04B 2235/788* (2013.01); *C04B 2235/81* (2013.01); F41H 5/0414 (2013.01)

(56) References Cited

U.S. PATENT DOCUMENTS

| | | |
|---|---|---|
| 5,354,536 A | 10/1994 | Ezis |
| 6,015,338 A | 1/2000 | Hong et al. |
| 6,805,034 B1 | 10/2004 | McCormick et al. |
| 7,510,990 B2 * | 3/2009 | Satoh et al. ............... 501/88 |
| 7,803,732 B1 | 9/2010 | Ashkin et al. |
| 8,003,042 B2 | 8/2011 | Cutler et al. |
| 2004/0237713 A1 | 12/2004 | Breslin et al. |
| 2007/0293392 A1 | 12/2007 | Ohno et al. |
| 2008/0093779 A1 * | 4/2008 | Cutler et al. ............... 264/682 |

* cited by examiner

CERAMIC BODY COMPRISING SILICON CARBIDE AND METHOD OF FORMING SAME

RELATED APPLICATION

This application claims priority under 35 U.S.C. §119(e) to U.S. Patent Application No. 61/660,493 entitled "Ceramic Body Comprising Silicon Carbide and Method of Forming the Same," by Ninos et al., filed Jun. 15, 2012, which is assigned to the current assignee hereof and incorporated herein by reference in its entirety.

BACKGROUND

1. Field of the Disclosure

The following is directed to ceramic articles, and particularly, ceramic articles comprising silicon carbide.

2. Description of the Related Art

Various composite materials are commercially available, including certain ceramic composite bodies incorporating silicon carbide. Silicon carbide-based ceramic materials have been utilized in many applications for their refractory properties and mechanical properties. Among the types of silicon carbide-based ceramics available, various types exist based on the particular forming process, including for example, sintered silicon carbide, hot pressed silicon carbide, and recrystallized silicon carbide. Each of the various types of silicon carbide bodies can have distinct features. For example, sintered silicon carbide (such as Hexoloy®) can be a very dense material, but is generally expensive and complex to produce. On the other hand, more cost effective but relatively porous silicon carbide materials such as nitride-bonded silicon carbide (known by acronyms such as NBSC and NSIC) have found practical use in refractory applications. Such refractory components include furnace or kiln furniture utilized in connection with holding or supporting work pieces during firing operations, as well as refractory lining materials. Nitride-bonded silicon carbide tends to be a comparatively porous material, oftentimes having a porosity within a range of about 10 to about 15 vol %.

In view of the state of the art of silicon carbide-based materials, there is a need in the art for improved composites.

SUMMARY

According to one aspect, a method of forming a ceramic body can include forming a mixture having a first powder material (PM1) comprising carbon having a first average particle size (PS1), and a second powder material (PM2) comprising carbon and different than the first powder material, wherein the second powder material can have a second average particle size (PS2) less than the first average particle size (PS1), and wherein the second powder material can have an aluminum content (AC2) greater than an aluminum content (AC1) of the first powder material. The method may also include forming a green body from the mixture and sintering the green body and forming a ceramic body. The ceramic body can have a first type of grain having an average grain size of not greater than about 8 times the first average particle size (PS1).

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the silicon carbide and refractory arts.

The following is directed to ceramic bodies comprising carbon, including for example, ceramic bodies of silicon carbide and methods of forming such articles. The ceramic bodies described herein may be suitable for use in various capacities, including for example armor applications, and more particularly, body armor and/or vehicle armor systems intended to thwart various projectile-based threats.

The process of forming the ceramic article can be initiated by forming a mixture. The mixture can include a combination of powder components. In accordance with an embodiment, the mixture may be a dry mixture or wet mixture. In particular instances, the mixture can be a wet mixture including a liquid carrier, which may be an organic material, and more particularly, an aqueous-based material (e.g., water or deionized water).

The mixture can include raw materials suitable for creating various crystalline phases in the finally-formed composite article. For example, a first powder material (PM1) including carbon can be added to the mixture. The first powder material may be a carbon-based material, such that it has a majority content of a carbon composition, such as a carbide. In one particular example, the first powder material can include silicon carbide, and even more particularly, may consist essentially of silicon carbide.

The first powder material can have a first average particle size (PS1), which may be generally designated as a D50 value, of not greater than about 10 microns. In other instances, the first average particle size can be less, such as not greater than about 8 microns, not greater than about 6 microns, not greater than about 4 microns, not greater than about 3 microns, or even not greater than about 2 microns. In still another non-limiting embodiment, the first powder material can have a first average particle size of at least about 0.1 microns, such as at least about 0.2 microns, at least about 0.3 microns, at least about 0.4 microns, at least about 0.5 microns, at least about 0.6 microns, at least about 0.7 microns, at least about 0.8 microns, or even at least about 0.9 microns. It will be appreciated that the first average particle size can be within a range between any of the above minimum and maximum values.

The first powder material may also be selected to have a particular specific surface area to facilitate formation of the ceramic body. For example, the first powder material may have a first specific surface area (SSA1) not greater than about 13 $m^2/g$. In other instances, the first specific surface area can be less, such as not greater than about 11 $m^2/g$, not greater than about 10 $m^2/g$, not greater than about 9 $m^2/g$, not greater than about 8 $m^2/g$, or even not greater than about 7 $m^2/g$. In still another non-limiting embodiment, the first specific surface area can be at least about 1 $m^2/g$, such as at least about 2 $m^2/g$, at least about 3 $m^2/g$, or even at least about 4 $m^2/g$. It will be appreciated that the first specific surface area can be within a range between any of the above minimum and maximum values.

The first powder material may be particularly pure, having very little content of certain species. For example, the first powder material may be essentially free of metallic silicon, oxides, nitrides, borides, and a combination thereof. Furthermore, according to one embodiment, the first powder material can have a particular content of aluminum that may facilitate formation of the ceramic articles herein. In one instance, the first powder material can have an aluminum content of less than about 800 ppm, such as less than about 700 ppm, less than about 600 ppm, less than about 500 ppm, less than about 400 ppm. Still, in one non-limiting embodiment, the first powder material can have an aluminum content of at least about 10 ppm, such as at least about 50 ppm, at least about 100 ppm, or even at least about 200 ppm. It will be appreciated that the aluminum content of the first powder material can be within a range between any of the above minimum and maximum values.

The first powder material can have a considerably low content of boron, such as less than about 200 ppm, such as less than about 100 ppm, less than about 50 ppm, or even less than about 10 ppm.

Additionally, in at least one embodiment, the first powder material can have a particular content of iron, including for example, at least about 50 ppm, at least about 100 ppm, or even at least about 200 ppm. Still, the content of iron within the first powder material can be not greater than about 500 ppm, such as not greater than about 400 ppm, not greater than about 300 ppm, or even not greater than about 280 ppm. It will be appreciated that the iron content of the first powder material can be within a range between any of the above minimum and maximum values.

In still another embodiment, the first powder material can have a particular content of titanium, including for example, at least about 50 ppm, at least about 80 ppm, or even at least about 100 ppm. Still, the content of titanium within the first powder material can be not greater than about 500 ppm, such as not greater than about 400 ppm, not greater than about 300 ppm, or even not greater than about 200 ppm. It will be appreciated that the titanium content of the first powder material can be within a range between any of the above minimum and maximum values.

Moreover, the first powder material can have a particular content of free carbon, including for example, not greater than about 5000 ppm, such as not greater than about 4000 ppm, not greater than about 3000 ppm, or even not greater than about 2500 ppm. Still, the content of free carbon within the first powder material can be at least about 500 ppm, at least about 800 ppm, or even at least about 1000 ppm. It will be appreciated that the free carbon content of the first powder material can be within a range between any of the above minimum and maximum values.

According to one formulation, the mixture can have a particular content of the first powder material to facilitate the formation of the ceramic article. A suitable content of the first powder material according to an embodiment, is at least about 10 wt % for the total weight of the mixture. In other instances, the amount of the first powder material in the mixture can be greater, such as at least about 15 wt %, at least about 20 wt %, at least about 30 wt %, at least about 40 wt %, at least about 45 wt %, at least about 50 wt %, at least about 53 wt %, or even at least about 55 wt %. In yet another non-limiting embodiment, the content of the first powder material in the mixture can be not greater than about 90 wt %, such as not greater than about 80 wt %, not greater than about 70 wt %, not greater than about 68 wt %, not greater than about 65 wt %, not greater than about 62 wt %, not greater than about 59 wt %. It will be appreciated that the content of the first powder material within the mixture can be within a range between any of the above minimum and maximum percentages.

The mixture may further include a second powder material (PM2) different than the first powder material. The second powder material may be a carbon-based material, such that a majority content of the second powder material is of a carbon composition. A suitable exemplary carbon composition can include a carbide. In one particular example, the second powder material can include silicon carbide, and even more particularly, may consist essentially of silicon carbide. In one particular embodiment, the second powder material may consist essentially of silicon carbide black.

The second powder material can have a second average particle size (PS2), which may be generally designated as a D50 value, and suitable for facilitating the formation of a ceramic article according to an embodiment herein. For example, the second powder material may have a second average particle size of not greater than about 8 microns. In other instances, the second average particle size can be less, such as not greater than about 6 microns, not greater than about 4 microns, not greater than about 2 microns, not greater than about 1 microns, or even not greater than about 0.9 microns. In still another non-limiting embodiment, the second powder material can have a second average particle size of at least about 0.2 microns, at least about 0.3 microns, at least about 0.4 microns, at least about 0.5 microns, at least about 0.6 microns, or even at least about 0.7 microns. It will be appreciated that the second average particle size can be within a range between any of the above minimum and maximum values.

The second powder material may also be selected to have a particular specific surface area to facilitate formation of the ceramic body. For example, the second powder material may have a second specific surface area (SSA2) can be at least about 6 m²/g. In other instances, the second specific surface area, can be at least about 8 m²/g, such as at least about 10 m²/g, at least about 12 m²/g, at least about 14 m²/g. In still another non-limiting embodiment, the second specific surface area can be not greater than about 30 m²/g, not greater than about 25 m²/g, not greater than about 20 m²/g, or even not greater than about 18 m²/g. It will be appreciated that the second specific surface area can be within a range between any of the above minimum and maximum values.

The second powder material may have a particular composition, including for example, relative free of certain elements or compositions, including for example, essentially free of metallic silicon, oxides, nitrides, borides, and a combination thereof. Furthermore, according to one embodiment, the second powder material can have a particular content of aluminum that may facilitate formation of the ceramic articles herein. For example, the content of aluminum in the second powder material can be greater than the content of aluminum in the first powder material. In certain instances, the second powder material can have an aluminum content of at least about 900 ppm, such as at least about 1000 ppm, at least about 1100 ppm, at least about 1200 ppm, at least about 1300 ppm, at least about 1500 ppm, at least about 1800 ppm. Still, in one non-limiting embodiment, the second powder material can have an aluminum content of not greater than about 3000 ppm, such as not greater than about 2800 ppm, or even not greater than about 2600 ppm. It will be appreciated that the aluminum content of the second powder material can be within a range between any of the above minimum and maximum values.

The second powder material can have a considerably low content of boron, such as less than about 200 ppm, such as less than about 100 ppm, less than about 50 ppm, or even less than about 10 ppm.

Additionally, in at least one embodiment, the second powder material can have a particular content of iron, including for example, at least about 50 ppm, at least about 100 ppm, at least about 200 ppm, at least about 500 ppm, at least about 1000 ppm, or even at least about 1500 ppm. Still, the content of iron within the second powder material can be not greater than about 5000 ppm, such as not greater than about 4000 ppm, not greater than about 3500 ppm, or even not greater than about 3000 ppm. It will be appreciated that the iron content of the second powder material can be within a range between any of the above minimum and maximum values.

The content of iron within the second powder material can be significantly greater than the content of iron within the first powder material. For example, the second powder material can have at least about 10% greater content of iron based on the equation $((Fe2-Fe1)/Fe2) \times 100\%$, wherein Fe1 is the content of iron within the first powder material and Fe2 is the content of iron within the second powder material. In other instances, the second powder material can have a content of iron of at least about 20% greater, such as at least about 30% greater, at least about 50% greater, at least about 70% greater, or even at least about 85% greater than the content of iron within the first powder material. Still, in one non-limiting embodiment, the content of iron within the second powder material can be not greater than about 99% greater, not greater than about 95% greater, or even not greater than about 90% greater than the content of iron in the first powder material. It will be appreciated that the difference in iron content between the first powder material and the second powder material can be within a range between any of the above minimum and maximum percentages.

In still another embodiment, the second powder material can have a particular content of titanium, including for example, at least about 50 ppm, at least about 80 ppm, or even at least about 100 ppm. Still, the content of titanium within the second powder material can be not greater than about 500 ppm, such as not greater than about 400 ppm, not greater than about 300 ppm, or even not greater than about 200 ppm. It will be appreciated that the titanium content of the second powder material can be within a range between any of the above minimum and maximum values.

Moreover, the second powder material can have a particular content of free carbon, including for example, not greater than about 2000 ppm, such as on the order of not greater than about 1000 ppm, such as not greater than about 500 ppm, not greater than about 250 ppm, or even not greater than about 100 ppm. Still, the content of free carbon within the second powder material can be at least about 1 ppm, at least about 10 ppm, or even at least about 20 ppm. It will be appreciated that the free carbon content of the second powder material can be within a range between any of the above minimum and maximum values.

The content of free carbon within the second powder material can be significantly less than the content of free carbon within the first powder material. For example, the first powder material can have at least about 10% greater content of free carbon based on the equation $((C1-C2)/C1) \times 100\%$, wherein C1 is the content of free carbon within the first powder material and C2 is the content of free carbon within the second powder material. In other instances, the first powder material can have a content of free carbon of at least about 20% greater, such as at least about 30% greater, at least about 50% greater, at least about 70% greater, or even at least about 85% greater than the content of free carbon in the second powder material. Still, in one non-limiting embodiment, the content of free carbon within the first powder material can be not greater than about 99.9% greater, such as not greater than about 98% greater, or even not greater than about 95% greater than the content of free carbon in the second powder material. It will be appreciated that the difference in free carbon content between the first powder material and the second powder material can be within a range between any of the above minimum and maximum percentages.

According to one formulation, the mixture can have a particular content of the second powder material to facilitate the formation of the ceramic article. A suitable content of the second powder material according to an embodiment can be at least about 10 wt % for the total weight of the mixture. In other instances, the amount of the first powder material in the mixture can be greater, such as at least about 15 wt %, at least about 18 wt %, at least about 20 wt %, at least about 22 wt %, at least about 25 wt %, or even at least about 28 wt %. In yet another non-limiting embodiment, the content of the second powder material in the mixture can be not greater than about 50 wt %, such as not greater than about 40 wt %, not greater than about 38 wt %, not greater than about 35 wt %, or even not greater than about 32 wt %. It will be appreciated that the content of the second powder material within the mixture can be within a range between any of the above minimum and maximum percentages.

According to at least one embodiment, the mixture can be formed to have a particular ratio of the content (wt %) of the first powder material (PM1) and the second powder material (PM2) to facilitate formation of the ceramic article. For example, the mixture can have a ratio (PM1/PM2) of the content (wt %) of the first powder material to the second powder material of at least about 1.1, such as at least about 1.2, at least about 1.3, or even at least about 1.4. In yet another non-limiting embodiment, the ratio (PM1/PM2) can be not greater than about 8, such as not greater than about 6, not greater than about 5, not greater than about 4, not greater than about 3, or even not greater than about 2. It will be appreciated that the ratio can be within a range between any of the above minimum and maximum values.

In certain instances, the first powder material and the second powder material can have certain average particle sizes with relation to each other to facilitate the formation of a ceramic article according to an embodiment herein. For example, the second average particle size (PS2) can be less than the first average particle size (PS1). In particular embodiments, the second average particle size can be at least about 5% less than the first average particle size based on the equation ((PS1−PS2)/PS1)×100%. According to another instance, the second average particle size can be at least about 8% less, at least about 10% less, at least about 12% less, at least about 14% less, at least about 16% less, or even at least about 18% less than the first average particle size. In one non-limiting embodiment, the second average particle size can be not greater than about 80% less, such as not greater than about 70% less, not greater than about 60% less, not greater than about 50% less, not greater than about 45% less, not greater than about 40% less, not greater than about 35% less, or even not greater than about 32% less than the first average particle size. It will be appreciated that the difference in average particle size between the first average particle size and second average particle size can be within a range between any of the above minimum and maximum percentages.

Furthermore, in at least one embodiment herein, the first powder material and the second powder material can have certain specific surface areas relative to each other to facilitate the formation of a ceramic article. For example, the first powder material comprises a first specific surface (SSA1) less than the second specific surface area (SSA2) of the second powder material. In one instance, the first specific surface area is less than the second specific surface area by at least about 5% based on the equation ((SSA2−SSA1)/SSA2)×100%. Yet, in another embodiment, the first specific surface area is at least about 10% less, such as at least about 20% less, at least about 30% less, at least about 40% less, at least about 50% less, or even at least about 55% less than the second specific surface area. Still, in one non-limiting embodiment, the first specific surface area can be not greater than about 90% less, such as not greater than about 80% less, not greater than about 70% less, not greater than about 68% less, not greater than about 65% less than the second specific surface area. It will be appreciated that the difference between the first specific surface area and the second specific surface area can be within a range between any of the above minimum and maximum percentages.

Additionally, the first powder material and the second powder material can have a particular difference in the content of aluminum to facilitate the formation of the ceramic article. For example, the second powder material can have an aluminum content (AC2) of at least about 5% greater than the aluminum content (AC1) of the first powder material based on the equation ((AC2−AC1)/AC2)×100%. In yet another embodiment, the second powder material can have at least about 10% greater, at least about 15% greater, at least about 20% greater, at least about 25% greater, at least about 30% greater, at least about 35% greater, at least about 40% greater, at least about 45% greater, or even at least about 50% greater aluminum content than the first powder material. Still, in one non-limiting embodiment, the aluminum content of the second powder material can be not greater than about 95%, such as not greater than about 90%, not greater than about 85%, not greater than about 80%, not greater than about 75%, or even not greater than about 70% of the aluminum content of the first powder material. It will be appreciated that the difference in aluminum content between the first powder material and the second powder material can be within a range between any of the above minimum and maximum percentages.

Certain mixtures herein may further include an additive different than the first powder material and second powder material. Suitable examples of an additive can include an organic material, such as a binder, pH modifier, plasticizer, and the like. According to one particular embodiment, the mixture is formed with an additive including polyvinyl alcohol (PVA). Some other exemplary additives can include amines, including but not limited to triethanolamine, acrylics, formaldehydes, resins, and a combination thereof.

A mixture according to an embodiment herein may have a particular total amount of additive to facilitate the formation of a ceramic article. For example, the mixture can have a total content of an additive of not greater than about 18 wt % for the total weight of the mixture. In certain other instances, the total content of additive can be not greater than about 16 wt %, such as not greater than about 14 wt %, or even not greater than about 13 wt %. Still, in at least one non-limiting embodiment, the total content of additive in the mixture can be at least about 3 wt %, such as at least about 5 wt %, at least about 7 wt %, at least about 9 wt %, at least about 11 wt %. It will be appreciated that the total content of additive within the mixture can be within a range between any of the above minimum and maximum percentages.

After suitably making the mixture, the process can continue by forming a green body from the mixture. A green body is an unfinished form, capable of supporting itself, and particularly, may be a body that requires further treatment for full densification. In a certain embodiment, the process of forming the can include pressing, extruding, casting, punching, and a combination thereof. According to a particular embodiment, the process of forming includes a slip casting process.

After conducting the forming process, a drying process may be conducted on the green body. Drying may be an optional process that can be completed to volatilize certain materials within the green body, preparing the green body for further processing.

After conducting the drying process, the green body may undergo a sintering process. In one particular embodiment, sintering of the green body can include high temperature heat treatment to affect densification of the body. Notably, the sintering process in combination with other features described herein may be conducted to facilitate controlled grain growth for suitable properties of the ceramic article. In one embodiment, sintering the green body can be conducted at a sintering temperature of at least about 1600° C., such as at least about 1800° C., at least about 1900° C., or even at least about 2000° C. Yet, in one non-limiting embodiment, the sintering temperature may be not greater than about 2080° C., such as not greater than about 2400° C. not greater than about 2300° C., not greater than about 2200° C. not greater than about 2180° C. It will be appreciated that the sintering temperature can be within a range between any of the above minimum and maximum temperatures.

Moreover, sintering can be conducted for a certain duration, wherein the body is held at the sintering temperature. For example, the duration at the sintering temperature can be at least about 30 minutes, such as at least about 60 minutes, at least about 90 minutes, at least about 120 minutes, or even at least about 150 minutes. In yet one non-limiting embodiment, the duration at the sintering temperature can be not greater than about 6 hours, not greater than about 4 hours, not greater than about 3 hours. It will be appreciated that the duration at the sintering temperature can be within a range between any of the above minimum and maximum times.

For certain sintering operations, the atmosphere within the sintering chamber can be an inert atmosphere. More particularly, sintering may be conducted in an atmosphere comprising a noble gas. Even more particularly, sintering may be completed in an atmosphere comprising a majority content of argon, such as an atmosphere consisting essentially of argon. According to a particular embodiment, sintering may utilize a flowing condition, wherein the atmosphere comprises a flowing gas, such as a noble gas.

The atmosphere for sintering may also be controlled to have a particular pressure. For example, the pressure within the sintering chamber during sintering can be sintering is conducted in an atmosphere having a pressure of at least about 0.1 psi and not greater than about 10 psi, such as at least about 0.5 psi and not greater than about 3 psi.

After sintering is completed, a ceramic body is formed. The ceramic body can be in the form of a sintered silicon carbide body. Moreover, the ceramic body may be particularly dense, such that it has a porosity of not greater than about 10 vol % for the total volume of the ceramic body. In other instances, the porosity of the ceramic body can be less, such as not greater than about 8 vol %, not greater than about 5 vol %, not greater than about 4 vol %, not greater than about 3 vol %, not greater than about 2 vol %, or even not greater than about 1 vol %. Still, in one non-limiting embodiment, the porosity of the ceramic body may be at least about 0.1 vol %. It will be appreciated that the porosity can be within a range between any of the above minimum and maximum percentages.

Figure 1:
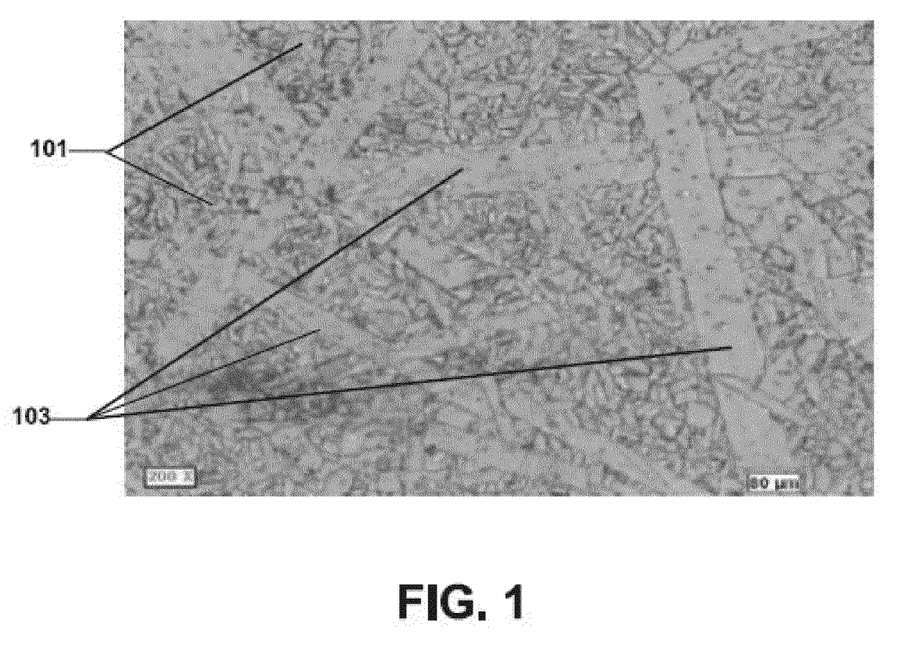
FIG. 1 is an optical microscope image of a portion of a ceramic body according to an embodiment.

FIG. 1 includes an optical microscope picture of a portion of a ceramic body according to an embodiment. In certain instances, the ceramic body can be a polycrystalline material. For example, the ceramic body can consist essentially of polycrystalline material. Moreover, in at least one embodiment, the ceramic body can include a first type of grain 101 and a second type of grain 103 different than the first type of grain 101. And in a more particular embodiment, the ceramic body may consist essentially of the first type of grain 101 and second type of grain 103. The first type of grain 101 may be formed from the first powder material and the second type of grain 103 may be substantially formed from the second powder material.

For example, according to one embodiment, the first type of grain 101 can include carbon, and particularly, can include a carbide. In one certain exemplary embodiment, the first type of grain 101 includes silicon carbide, and may consist essentially of silicon carbide. The ceramic body may be essentially free of certain materials, including for example, silicon metal, nitrides (e.g., aluminum nitride, oxides materials, boride materials, and a combination thereof.

Notably, based on the combination of features described herein, controlled grain growth can be suitably achieved such that the first type of grain 101 may have a particular first average grain size relative to the first average particle size of the first powder material. In accordance with an embodiment, the first average grain size can be not greater than about 8 times the first average particle size (PS1). In yet another embodiment, the first type of grain 101 has a first average grain size of not greater than about 7 times the first average particle size (PS1), such as not greater than about 6 times the first average particle size, not greater than about 5 times the first average particle size, or even not greater than about 4 times the first average particle size. Still, for another embodiment, the first average grain size can be at least about 1.1 times the first average particle size, such as at least about 1.3 times the first average particle size, or even at least about 1.5 times the first average particle size. It will be appreciated that the first average grain size relative to the first average particle size can be within a range between any of the above minimum and maximum values.

The ceramic body may contain a majority content of the first type of grain 101, such that for example, the ceramic body has at least about 52 vol % of the first type of grain 101 for the total volume of the ceramic body. In other instances, the content of the first type of grain 101 can be greater, such as at least about 55 vol %, at least about 58 vol %, at least about 62 vol %, at least about 65 vol %, at least about 68 vol %, at least about 72 vol %, or even at least about 75 vol %. In another non-limiting embodiment, the content of the first type of grain 101 within the ceramic body may be not greater than about 95 vol %, such as not greater than about 92 vol %, not greater than about 88 vol %, not greater than about 85 vol %, not greater than about 82 vol %, not greater than about 78 vol %. It will be appreciated that the content of the first type of grain 101 within the ceramic body can be within a range between any of the above minimum and maximum percentages.

According to a particular embodiment, the first type of grain 101 can have a particular aspect ratio. For example, the first type of grain 101 can have an average aspect ratio of not greater than about 1.4 wherein aspect ratio is a measure of length to width, wherein length is the longest dimension of the first type of grain 101 as viewed in two-dimensions and width is the shortest dimension of the first type of grain 101 as measured in two-dimensions in a direction perpendicular to a direction defined by the length. It will be appreciated that such an aspect ratio is based on the average length and width of a suitable sampling of particles as viewed using an appropriate technique (e.g., SEM). In certain instances, the average aspect ratio can be not greater than about 1.2. In yet certain other instances, the aspect ratio can be not less than about 0.8. For at least one non-limiting embodiment, the first type of grain 101 can be essentially equiaxed.

In certain exemplary ceramic bodies, the first type of grain 101 can have a particular average grain size, including for example, an average grain size of at least about 1 micron. For other embodiments, the first average grain size can be greater, such as least about 2 microns or on the order of at least about 3 microns. Still, in one non-limiting embodiment, the first average grain size of the first type of grain 101 can be not greater than about 15 microns, such as not greater than about 12 microns, not greater than about 10 microns, not greater than about 8 microns, or even not greater than about 6 microns. It will be appreciated that the first average grain size of the first type of grain 101 can be within a range between any of the above minimum and maximum values. Furthermore, it will be appreciated the average grain size can be based on a measurement of an average length of a suitable sampling of first type of grains within the ceramic body, as viewed at a suitable magnification.

As noted herein, the ceramic body may further include a second type of grain 103 dispersed within the ceramic body. In particular instances, the second type of grain 103 can be substantially homogeneously dispersed within the first type of grain 101. According to one embodiment, the second type of grain 103 can contain carbon, and more particularly may contain a carbide material. For a certain embodiment, the second type of grain 103 can include silicon carbide, and may consist essentially of silicon carbide and a minor content of aluminum.

The second type of grain 103 can include a controlled amount of aluminum, which may facilitate formation of the ceramic body. The majority of the aluminum content within the ceramic body may be contained within the second type of grain 103. Moreover, in certain instances, the second type of grain 103 can have an aluminum content greater than the first type of grain 101. According to one exemplary embodiment, the aluminum can be dispersed intragranularly within the second type of grain 103. Furthermore, the second type of grain 103 can have an aluminum content of at least about 500 ppm, at least about 600 ppm, at least about 700 ppm, at least about 900 ppm, at least about 1000 ppm, at least about 1100 ppm, at least about 1200 ppm, at least about 1300 ppm, at least about 1500 ppm, or even at least about 1800 ppm. Still, in one non-limiting embodiment, the second type of grain 103 can have an aluminum content of not greater than about 3000 ppm, such as not greater than about 2800 ppm, or even not greater than about 2600 ppm. It will be appreciated that the aluminum content of the second type of grain 103 can be within a range between any of the above minimum and maximum values.

In accordance with an embodiment, a ceramic body including the first type of grain and the second type of grain can include a controlled amount of aluminum, which may facilitate formation of the ceramic body. According to one exemplary embodiment, the ceramic body can have an aluminum content of not greater than about 800 ppm, such as not greater than about 700 ppm, not greater than about 600 ppm, not greater than about 580 ppm, not greater than about 550 ppm, not greater than about 530 ppm, not greater than about 510 ppm, or even not greater than about 500 ppm. Still, in one non-limiting embodiment, the ceramic body can have an aluminum content of at least about 100 ppm, such as at least about 200 ppm, at least about 250 ppm, at least about 300 ppm, at least about 350 ppm, at least about 400 ppm, at least about 450 ppm, or even at least about 500 ppm. It will be appreciated that the aluminum content of the ceramic body can be within a range between any of the above minimum and maximum values.

The second type of grain 103 may be present in a particular amount to facilitate formation of a ceramic body according to an embodiment. For example, the second type of grain 103 can be present in a minority content based on a statistical average of the total number of grains in the ceramic body, including for example, not greater than about 48 vol % for the total volume of the ceramic body. In yet another embodiment, the ceramic body may contain not greater than about 46 vol %, such as not greater than about 42 vol %, not greater than about 40 vol %, or even not greater than about 38 vol % of the second type of grain 103. According to one non-limiting embodiment, the amount of the second type of grain 103 in the ceramic body can be at least about 10 vol %, such as at least about 14 vol %, at least about 18 vol %, at least about 20 vol %, at least about 22 vol %, at least about 25 vol %, at least about 28 vol %, or even at least about 30 vol %. It will be appreciated that the content of the second type of grain 103 can be within a range between any of the above minimum and maximum percentages.

Based on the combination of features described herein, controlled grain growth can be suitably achieved such that the second type of grain 103 may have a particular second average grain size relative to the second average particle size of the second powder material. In accordance with an embodiment, the second average grain size can be not greater than about 1000 times the second average particle size (PS2). In yet another embodiment, the second type of grain 103 has a second average grain size of not greater than about 800 times the second average particle size, such as not greater than about 600 times the second average particle size, not greater than about 400 times the second average particle size, not greater than about 300 times the second average particle size, or even not greater than about 200 times the second average particle size. Still, for another embodiment, the second average grain size can be at least about 1.1 times the second average particle size, such as at least about 50 times the second average particle size, or even at least about 100 times the second average particle size. It will be appreciated that the second average grain size relative to the second average particle size can be within a range between any of the above minimum and maximum values. Furthermore, it will be appreciated the average grain size can be based on a measurement of an average length of a suitable sampling of second type of grains within the ceramic body, as viewed at a suitable magnification.

Based on the combination of features described herein, controlled grain growth can be suitably achieved such that the second type of grain 103 may have a particular second average grain size relative to a first average grain size of the first type of grain 101. In accordance with an embodiment, the second average grain size can be not greater than about 1000 times the first average grain size. In yet another embodiment, the second type of grain 103 has a second average grain size of not greater than about 800 times the first average grain size, such as not greater than about 600 times the first average grain size, not greater than about 400 times the first average grain size, not greater than about 300 times first average grain size, or even not greater than about 200 times the first average grain size. Still, for another embodiment, the second average grain size can be at least about 1.1 times the first average grain size, such as at least about 50 times first average grain size, or even at least about 100 times the first average grain size. It will be appreciated that the second average grain size relative to the first average grain size can be within a range between any of the above minimum and maximum values. Furthermore, it will be appreciated the average grain size can be based on a measurement of an average length of a suitable sampling of second type of grains within the ceramic body, as viewed at a suitable magnification.

Notably, one or more features of embodiments herein facilitate controlled grain growth of the first and second types of grain. Moreover, one or more features of embodiments herein facilitate controlled isotropic and anisotropic growth of the first type of grain and the second type of grain, respectively. In particular, the second type of grain may be formed through particularly controlled anisotropic growth, such that growth of the second powder material in one direction is significantly greater than the growth in another direction, thus facilitating the second type of grain having an elongated shaped.

In at least one embodiment, the second type of grain 103 can be acicular or elongated. For example, the second type of grain 103 can have an average aspect ratio (l/w) of at least about 1.4, wherein aspect ratio is a measure of length (l) to width (w), wherein length is the longest dimension of the second type of grain 103 as viewed in two-dimensions and width is the shortest dimension of the second type of grain 103 as measured in two-dimensions in a direction perpendicular to a direction defined by the length. It will be appreciated that such an aspect ratio is based on the average length and width of a suitable sampling of particles as viewed using an appropriate technique (e.g., SEM). According to another embodiment, the average aspect ratio of the second type of grain 103 can be at least about 1.8, at least about 2, at least about 3, at least about 4, or even at least about 10. Still, in one non-limiting embodiment, the average aspect ratio of the second type of grain 103 can be not greater than about 100.

In accordance with an embodiment, the ceramic body can include a particular average number of second types of grains viewable from a randomly selected area. It will be appreciated that the average number of second types of grains can be defined by the average number of second types of grains greater than 100 second types of grains viewable in randomly selected area, averaged by the number of randomly selected areas. In particular instances, the average number of second grains greater than 100 when viewed in a randomly selected area of about 1300 μm by about 1100 μm can be not greater than about 48, such as not greater than about 40, not greater than about 30, or even not greater than about 20. Still, in another non-limiting embodiment, the average number of second grains greater than 100 when viewed in a randomly selected sample viewing area of about 1300 μm by about 1100 μm can be at least about 3, such as at least about 5, at least about 10, at least about 15, or even at least about 20. It will be appreciated that the average number of second grains viewable can be within a range of any of the maximum or minimum values noted above. It will also be appreciated that the values indicated above can be viewed within another particular randomly selected area. For example, the randomly selected area can include an area of about 1140 μm by about 825 μm.

In at least one embodiment, the second type of grain 103 can have an average grain size (GS2) greater than an average grain size (GS1) of the first type of grain 101. For example, in certain instances, the second average grain size can be least about 5% greater than the first average grain size based on the equation $((GS2-GS1)/GS2) \times 100\%$. In yet another embodiment, the second average grain size can be at least about 10% greater, such as at least about 15% greater, at least about 20% greater, at least about 25% greater, at least about 30% greater, at least about 35% greater, at least about 40% greater, at least about 45% greater, or even at least about 50% greater than the first average grain size. According to another example, the second average grain size can be not greater than about 95% greater, such as not greater than about 90% greater, not greater than about 85% greater, not greater than about 80% greater, not greater than about 75% greater, or even not greater than about 70% greater than the first average grain size.

In at least one embodiment, the second type of grain 103 can have a second average grain size (GS2) of at least about 4 microns, such as at least about 10 microns, at least about 20 microns, at least about 40 microns, at least about 60 microns, at least about 80 microns, or even at least about 100 microns. According to another non-limiting embodiment, the average grain size of the second type of grain 103 can be not greater than about 1000 microns, not greater than about 800 microns, not greater than about 600 microns, not greater than about 400 microns.

In accordance with an embodiment, the ceramic body can have a particular ratio of a content of the first type of grain to the second type of grain. For example, the ratio of the content of the first type of grain to the second type of grain can be not greater than about 3.5, such as not greater than about 3.0, not greater than about 2.5, or even not greater than about 2.0. In another non-limiting embodiment, the ratio of the content of the first type of grain to the second type of grain can be at least about 0.5, such as at least about 1.0, at least about 1.5, or even at least about 2.0. It will be appreciated that the ratio of the first type of grain to the second type of grain can be within a range of any of the maximum or minimum values noted above.

In accordance with an embodiment, the ceramic body can have a particular concentration of the second type of grain. In certain instances, the ceramic body can have a second type grain concentration of not greater than about 34 per $mm^2$, not greater than about 30 per $mm^2$, not greater than about 25 per $mm^2$, not greater than about 20 per $mm^2$, not greater than about 15 per $mm^2$, not greater than about 14 per $mm^2$, not greater than about 13 per $mm^2$, not greater than about 12 per $mm^2$. In another non-limiting embodiment, the ceramic body can have a second type grain concentration of at least about 4 per $mm^2$, at least about 5 per $mm^2$, at least about 6 per $mm^2$, at least about 7 per $mm^2$, at least about 8 per $mm^2$, at least about 9 per $mm^2$, at least about 10 per $mm^2$. It will be appreciated that the ceramic body can have a second type grain concentration between any of the maximum and minimum values noted above.

The ceramic bodies of the embodiments herein may be particularly suited for use as armor. The embodiments herein are directed to ceramic bodies having a controlled microstructure and particular mechanical properties facilitated by a combination of features facilitating controlled grain growth. The combination of features can include, but is not limited to, the relative size and specific surface area of the raw material powders, content of aluminum, dispersion of the elements, absence of certain materials, and others that represent a departure from the state of the art. The description is not intended to set forth a hierarchy of features, but different features that can be combined in one or more manners to define the invention.

In accordance with an embodiment, a ceramic body may include a particular hardness. In particular instances, a ceramic body may include a Knoop hardness (Pa) (1 kg load) of not greater than about 2500 Pa, such as not greater than about 2450 Pa, not greater than about 2400 Pa, not greater than about 2350 Pa, not greater than about 2300 Pa, or even not greater than about 2250 Pa. In another non-limiting embodiment, a ceramic body may include a Knoop hardness (Pa) (1 kg load) of at least about 2000 Pa, such as at least about 2050 Pa, at least about 2100 Pa, at least about 2150 Pa, at least about 2200 Pa, or even at least about 2250 Pa. It will be appreciated that the Knoop hardness can be within any maximum or minimum values noted above.

In accordance with an embodiment, a ceramic body may include a particular density. In particular instances, a ceramic body may includes a density of not greater than about 3.50 $g/cm^2$, such as not greater than about 3.40 $g/cm^2$, not greater than about 3.30, not greater than about 3.20 $g/cm^2$, not greater than about 3.20, not greater than about 3.15 $g/cm^2$. In another non-limiting embodiment, a ceramic boy may include a density of at least about 3.0 $g/cm^2$, such as at least about 3.05 $g/cm^2$, at least about 3.10 $g/cm^2$, or even at least about 3.13 $g/cm^2$. It will be appreciated that the density of the ceramic body may be within any of the maximum or minimum values noted above.

In accordance with an embodiment, a ceramic body may include a particular average grain size of the second type of grain with respect to the average grain size of the first type of grain. In particular instances, the armor component can have a second type of grain having an average grain size of not greater than about 1000 times an average grain size of the first type of grain, such as not greater than about 800 times the average grain size of the first type of grain, not greater than about 600 times the average grain size of the first type of grain, not greater than about 400 times the average grain size of the first type of grain, not greater than about 300 times the average grain size of the first type of grain, or even not greater than about 200 times the average grain size of the first type of grain. In another non-limiting embodiment, the armor component can have a second type of grain having an average grain size of at least about 1.1 times the average grain size of the first type of grain, such as at least about 50 times the average grain size of the first type of grain, or even t least about 100 times the average grain size of the first type of grain. It will be appreciated that the average grain size of the second type of grain with respect to the first type of grain can be within any maximum or minimum values noted above.

In accordance with an embodiment, the ceramic body can have a particular weight percentage (wt %) of grains having a 4H polytype structure. In particular instances, the ceramic body can include at least about 30 wt % of grains having a 4H polytype, such as at least about 35 wt % of grains having a 4H polytype, at least about 40 wt % of grains having a 4H polytype, or even at least about 45 wt % of grains having a 4H polytype. In another non-limiting embodiment, the ceramic body can have not greater than about 50 wt % of grains having a 4H polytype, such as not greater than about 45 wt % of grains having a 4H polytype, not greater than about 40 wt % of grains having a 4H polytype, or even not greater than about 35 wt % of grains having a 4H polytype. It will be appreciated that the weight percentage of grains having a 4H polytype in the ceramic body can be within any range of maximum or minimum values noted above.

In accordance with an embodiment, the ceramic body can have a particular weight percentage (wt %) of grains having a 6H polytype structure. In particular instances, the ceramic body can include at least about 48 wt % of grains having a 6H polytype, such as at least about 50 wt % of grains having a 6H polytype, at least about 55 wt % of grains having a six6H polytype, at least about 60 wt % of grains having a 6H polytype, or even at least about 65 wt % of grains having a 6H polytype. In another non-limiting embodiment, the ceramic body can have not greater than about 67 wt % of grains having a 6H polytype, such as not greater than about 65 wt % of grains having a 6H polytype, not greater than about 60 wt % of grains having a 6H polytype, not greater than about 55 wt % of grains having a 6H polytype, or even not greater than about 50 wt % of grains having a 6H polytype. It will be appreciated that the weight percentage of grains having a 6H polytype in the ceramic body can be within any range of maximum or minimum values noted above.

In accordance with an embodiment, the ceramic body can have a ratio of grains having a 6H polytype to grains having a 4H polytype. In particular instances, the ceramic body can have a ratio of grains having a 6H polytype to grains having a 4H polytype of not greater than about 3.5, such as not greater than about 3.0, not greater than about 2.5, or even not greater than about 2.0, In another non-limiting embodiment, the ceramic body can have a ratio of grains having a 6H polytype to grains having a 4H polytype of at least about 0.5, such as at least about 1.0, or even at least about 1.5. It will be appreciated that the ratio of grains having a 6H polytype to grains having a 4H polytype in the ceramic body can be within any range of maximum or minimum values noted above.

In accordance with an embodiment, an armor component can include a ceramic body and a first component adjacent the ceramic body. In particular instances, the first component may overlie the ceramic body. In other embodiments, it will be appreciated that the first component may have a particular position relative to the ceramic body. For example, the first component may underlie the ceramic body. Further, another construction of the armor component can include a ceramic body disposed between a first component and a third component. It will be appreciated that various suitable arrangements of the ceramic body relative to other components (e.g., the first component and the second component) are contemplated and within the scope of the embodiments described herein. In accordance with an embodiment, the first component can be abutting at least a portion of the ceramic body, and more particularly, may be in direct contact with a first major surface of the ceramic body. More particularly, the first component and ceramic body may be bonded to each other at the first major surface of the ceramic body.

In accordance with an embodiment, the first component may include a particular material, including but not limited to a ceramic, such as a boride, a nitride, an oxide, a carbide, and any combination thereof. In particular, the first component 102 may include alumina ($Al_2O_3$), boron carbide ($B_4C$), silicon carbide (SiC), calcium hexaboride ($CaB_6$), aluminum dodecaboride ($AlB_{12}$), boron suboxide ($B_6O$), silicon nitride ($Si_3N_4$), aluminum nitride (AlN), and any combination thereof. In still another alternative embodiment, the first component may include a material, such as an organic material component, and more particularly a polymer, such as a polyethylene, polyurethane, a fluorinated polymer, a resin, a thermoset, a thermoplastic, a para-aramid fiber, and any combination thereof.

Further, it will be appreciated that the first component may include a composite material, which may include a combination of materials, including for example natural materials, synthetic materials, organic materials, inorganic materials, and any combination thereof. Some suitable inorganic materials can include ceramics, metals, glasses, and the like.

In one particular embodiment, the first component may include a boride material. In particular instances, the boride material may include one metal element, including, for example, but not limited to, a transition metal element. In certain instances, the metal element may include zirconium (Zr), titanium (Ti), aluminum (Al), and a combination thereof. For example, the first component 102 may include calcium hexaboride ($CaB_6$), aluminum dodecaboride ($AlB_{12}$), magnesium aluminum diboride ($MgAlB_2$). In one particular instance, the first component may include zirconium boride ($ZrB_2$). In still another embodiment, the first component may include titanium boride ($TiB_2$).

In an alternative embodiment, the first component may include a composition, such as a first composition that is different than the composition of the ceramic body. For example, the first component may include a first composition including a nitride material that is different than a nitride material contained within the ceramic body. The nitride material of the first component may include a metal element, in particular a transition metal element. In particular instances, the first component may include silica nitride ($Si_3N_4$), titanium nitride (TiN), aluminium nitride (AlN), and a combination thereof.

In accordance with another embodiment, the first component may include a ceramic material, including an oxide material. In certain instances, the oxide material may include aluminum oxide ($Al_2O_3$), boron suboxide ($B_6O$), and a combination thereof. In other instances, the oxide material may include at least one element, including, but not limited to, a transition metal element. For example, some suitable metal elements can include yttrium (Y), lanthanum (La), and a combination thereof. In one particular instance, the first component can include an oxide material including yttria ($Y_2O_3$). In another embodiment, the first component can include an oxide material comprising lanthanum oxide ($La_2O_3$).

In still another embodiment, the first component may include a ceramic material, such as a carbide material. Suitable carbide materials may include at least one metal element, including, for example, but not limited to, a transition metal element. Some suitable transitional metal elements can include, for example, titanium (Ti), aluminum (Al), boron (B), and a combination thereof. For example, the first component may include a ceramic material comprising titanium carbide (TiC). In another embodiment, the first component can include a carbide material including aluminum carbide (Al4C3). In another embodiment, the first component may include silicon carbide (SiC). In yet another embodiment, the first component may include a carbide material including boron carbide (B4C).

In still other instances, the first component may include some natural materials, for example a woven material. In other instances, the first component may include a non-woven material. Some suitable examples of woven and non-woven material can include those utilizing a fiber, and more particularly, may include a ballistic fiber. In accordance with an embodiment, the ballistic fiber may include a natural material, synthetic material, and a combination thereof. According to one particular design, the first component may include a ballistic fiber that includes nylon.

In another aspect, the armor component may include a second component that is distinct from the first component and ceramic body. In certain instances, one or more of the ceramic body, the first component, or the second component may be in the form of a layer. As such, the second component can have dimensions substantially similar to the ceramic body and first component as described in embodiments herein. As further illustrated, the second component may be adjacent to the ceramic component. More particularly, the second component may be overlying the ceramic body. For example, the second component can be underlying the ceramic body, and more particularly, may be abutting the ceramic body. It will be appreciated that the second component can have any of the attributes of the first component and the ceramic body described in the embodiments herein.

EXAMPLE 1

A first sample mixture (S1) was prepared by mixing a first silicon carbide powder (i.e., green silicon carbide) material and a second silicon carbide powder (i.e., black silicon carbide) material including carbon and aluminum. The black silicon carbide power material included an aluminum content of approximately 800-900 ppm. The first sample mixture (S1) included about 30 wt % of the second powder material to the total weight of the mixture. The remaining content of the mixture included the first powder material and appropriate binders. The mixture was formed into a green body.

The green body was sintered at in a furnace in an inert gas atmosphere under pressureless sintering conditions, the furnace was ramped to a sintering temperature of between about 2000° C. to about 2200° C. over a duration of approximately 6 hours. The body was held at the sintering temperature for approximately 6 hours to form a ceramic body according to an embodiment.

The ceramic body of Sample S1 was then prepared for viewing to determine the second type of grain concentration according to the second grain concentration standard test. The procedure for calculating the second type of grain concentration includes cutting a sample and preparing the cut surface for viewing with a scanning electron microscope (SEM). A random area of the sample is viewed at a magnification of 50×, defining a view area of approximately 1.4 mm$^2$, and particularly an area of the sample of 1300 μm by about 1100 μm. The second type of grains are elongated grains. Any of the second type of grains longer than 100 μm in the viewing area are counted as part of the second type of grain. The process is repeated at other randomly selected areas on the sample to obtain a statistically relevant average. The second type of grain concentration is calculated as the number of grains having a length greater than 100 microns within the viewing area and dividing the number of grains by the area (i.e., approximately 1.4).

As shown below in Table 1, Sample S1 had an average number of grains greater than 100 μm in a field of view of 1300 μm by 1100 μm of 18, corresponding to an average number of elongated grains per mm$^2$ of about 12.6.

EXAMPLE 2

A third sample (S2) was prepared similar to Sample S1, except having a content of the second powder material of about 40%. As shown in Table 1, S2 had an average number of grains greater than 100 μm in field of view of 1300 μm by 1100 μm of 27, corresponding to an average number of elongated grains per mm$^2$ of about 18.9.

EXAMPLE 3

A fourth sample (S3) was prepared similar to Sample S1, except having a content of the second powder material of about 33%. As shown in Table 1, S3 had an average number of grains greater than 100 μm in field of view of 1300 μm by 1100 μm of 15, corresponding to an average number of elongated grains per mm$^2$ of about 10.5.

EXAMPLE 4

A filth sample (S4) was prepared similar to Sample S3, having a content of the second powder material of about 33%. As shown in Table 1, S5 had an average number of grains greater than 100 μm in field of view of 1300 μm by 1100 μm of 17, corresponding to an average number of elongated grains per mm$^2$ of about 10.5.

EXAMPLE 5

Figure 2:
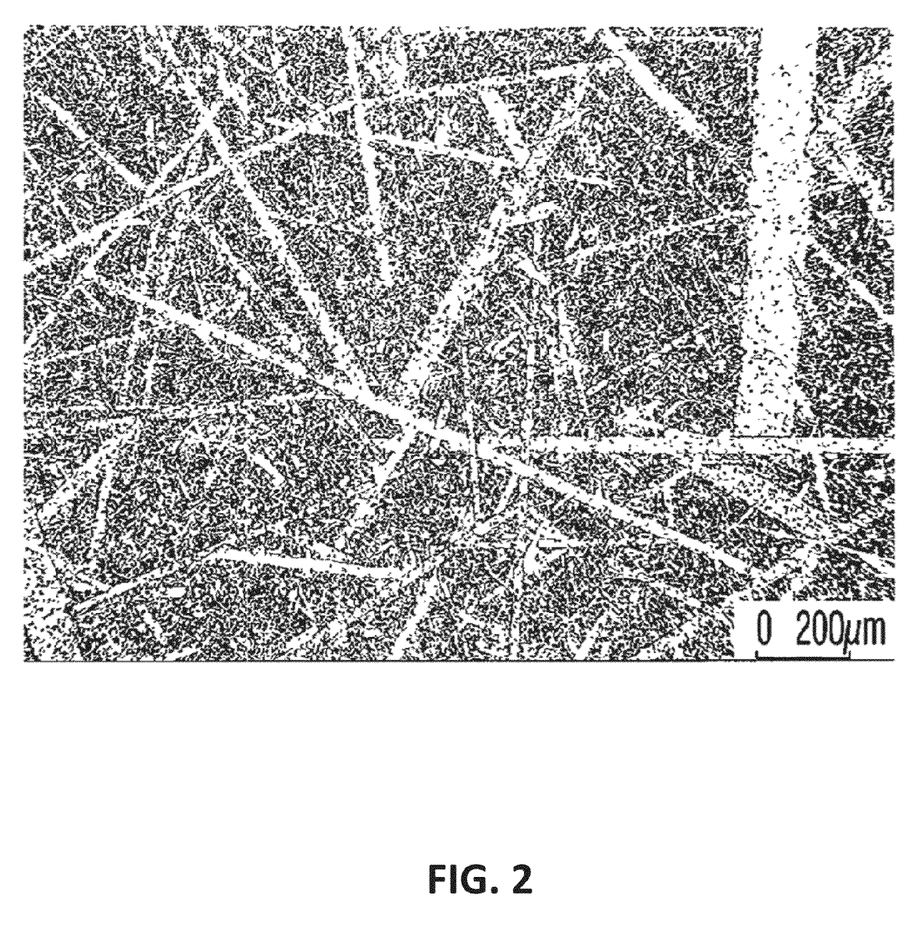
FIG. 2 is an optical microscope image of a portion of a ceramic body according to a comparative example.

FIG. 2 is a photo of a comparative example (CS1) of a ceramic body having an average number of grains greater than 100 μm of a randomly selected area of about 1140 μm by about 825 μm of about 50. As shown in Table 1, CS1 had an average number of elongated grains per mm$^2$ of about 53.2.

TABLE 1

| Sample | Second powder content | Avg. number of grains greater than 100 μm in field of view of 1300 μm by 1100 μm | Second grain concentration (elongated grains/mm$^2$) |
|---|---|---|---|
| S1 | 30% | 18 | 12.6 |
| S2 | 40% | 27 | 18.9 |
| S3 | 33% | 15 | 10.5 |
| S4 | 33% | 17 | 11.9 |
| CS1 | — | 50 | 53.2 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A method of forming a ceramic body can include forming a mixture including a first powder material (PM1) including carbon having a first average particle size (PS1); and a second powder material (PM2) including carbon and different than the first powder material, wherein the second powder material has a second average particle size (PS2) less than the first average particle size (PS1), and wherein the second powder material has an aluminum content (AC2) greater than an aluminum content (AC1) of the first powder material. The method can also include forming a green body from the mixture; and sintering the green body and forming a ceramic body including a first type of grain having an average grain size of not greater than about 8 times the first average particle size (PS1).

Item 2. The method of Item 1, wherein the first powder material is a carbon-based material, wherein the first powder material includes silicon carbide, wherein the first powder material consists essentially of silicon carbide.

Item 3. The method of Item 1, wherein the first powder material has a first average particle size of not greater than about 10 microns, not greater than about 8 microns, not greater than about 6 microns, not greater than about 4 microns, not greater than about 3 microns, not greater than about 2 microns, and at least about 0.1 microns, at least about 0.2 microns, at least about 0.3 microns, at least about 0.4 microns, at least about 0.5 microns, at least about 0.6 microns, at least about 0.7 microns, at least about 0.8 microns, at least about 0.9 microns.

Item 4. The method of Item 1, wherein the second average particle size is at least about 5% less than the first average particle size based on the equation ((PS1−PS2)/PS1)×100%, at least about 8% less, at least about 10% less, at least about 12% less, at least about 14% less, at least about 16% less, at least about 18% less, and not greater than about 80% less, not greater than about 70% less, not greater than about 60% less, not greater than about 50% less, not greater than about 45% less, not greater than about 40% less, not greater than about 35% less, not greater than about 32% less.

Item 5. The method of Item 1, wherein the second powder material is a carbon-based material, wherein the second powder material includes silicon carbide, wherein the second powder material consists essentially of silicon carbide, wherein the second powder material consists essentially of silicon carbide black.

Item 6. The method of Item 1, wherein the second powder material has a second average particle size of not greater than about 8 microns, not greater than about 6 microns, not greater than about 4 microns, not greater than about 2 microns, not greater than about 1 microns, not greater than about 0.9 microns, and at least about 0.2 microns, at least about 0.3 microns, at least about 0.4 microns, at least about 0.5 microns, at least about 0.6 microns, at least about 0.7 microns.

Item 7. The method of Item 1, wherein the first powder material includes a specific surface (SSA1) and the second powder material includes a second specific surface area (SSA2), wherein the first specific surface area is less than the second specific surface area, wherein the first specific surface area is less than the second specific surface area by at least about 5% based on the equation ((SSA2−SSA1)/SSA2)×100%, at least about 10% less, at least about 20% less, at least about 30% less, at least about 40% less, at least about 50% less, at least about 55% less, and not greater than about 90% less, not greater than about 80% less, not greater than about 70% less, not greater than about 68% less, not greater than about 65% less.

Item 8. The method of Item 1, wherein the mixture includes a ratio (PM1/PM2) of the content (wt %) of the first powder material to the second powder material of at least about 1.1, at least about 1.2 at least about 1.3, at least about 1.4, and not greater than about 8, not greater than about 6, not greater than about 5, not greater than about 4, not greater than about 3, not greater than about 2.

Item 9. The method of Item 1, wherein the mixture includes a content of the first powder of at least about 10 wt % for the total weight of the mixture, at least about 15 wt %, at least about 20 wt %, at least about 30 wt %, at least about 40 wt %, at least about 45 wt %, at least about 50 wt %, at least about 53 wt %, at least about 55 wt %, and not greater than about 90 wt %, not greater than about 80 wt %, not greater than about 70 wt %, not greater than about 68 wt %, not greater than about 65 wt %, not greater than about 62 wt %, not greater than about 59 wt %.

Item 10. The method of Item 1, wherein the mixture includes a content of the second powder of at least about 10 wt % for the total weight of the mixture, at least about 15 wt %, at least about 18 wt %, at least about 20 wt %, at least about 22 wt %, at least about 25 wt %, at least about 28 wt %, and not greater than about 50 wt %, not greater than about 40 wt %, not greater than about 38 wt %, not greater than about 35 wt %, not greater than about 32 wt %.

Item 11. The method of Item 1, wherein the mixture further includes an additive, wherein the additive includes an organic material, wherein the additive includes a binder, wherein the additive includes polyvinylalcohol (PVA), wherein the additive is selected from the group consisting of polyvinyl alcohol, triethanolamine, acrylics, formaldehydes, resins, and a combination thereof.

Item 12. The method of Item 1, wherein the mixture includes a total content of an additive of not greater than about 18 wt % for the total weight of the mixture, not greater than about 16 wt %, not greater than about 14 wt %, not greater than about 13 wt %, and at least about 3 wt %, at least about 5 wt %, at least about 7 wt %, at least about 9 wt %, at least about 11 wt %.

Item 13. The method of Item 1, wherein the second powder material includes an aluminum content (AC2) of at least about 5% greater than the aluminum content (AC1) of the first powder material based on the equation ((AC2−AC1)/AC2)×100%, at least about 10% greater, at least about 15% greater, at least about 20% greater, at least about 25% greater, at least about 30% greater, at least about 35% greater, at least about 40% greater, at least about 45% greater, at least about 50% greater, and not greater than about 95%, not greater than about 90%, not greater than about 85%, not greater than about 80%, not greater than about 75%, not greater than about 70%.

Item 14. The method of Item 1, wherein the aluminum content of the first powder material is less than about 800 ppm, less than about 700 ppm, less than about 600 ppm, less than about 500 ppm, less than about 400 ppm, less than about 300 ppm, and at least about 10 ppm.

Item 15. The method of Item 1, wherein the aluminum content of the second powder material is at least labout 900 ppm, at least about 1000 ppm, at least about 1100 ppm, at least about 1200 ppm, at least about 1300 ppm, at least about 1500 ppm, at least about 1800 ppm, and not greater than about 3000 ppm, not greater than about 2800 ppm, not greater than about 2600 ppm.

Item 16. The method of Item 1, wherein the mixture is a wet mixture.

Item 17. The method of Item 1, wherein forming includes a shaping process selected from the group consisting of pressing, extruding, casting, punching and a combination thereof, wherein forming includes slip casting.

Item 18. The method of Item 1, wherein forming a green body further includes drying the green body.

Item 19. The method of Item 1, wherein sintering the green body is conducted after forming, wherein sintering is conducted at a sintering temperature of at least about 1600° C., at least about 1800° C., at least about 1900° C., at least about 2000° C., and not greater than about 2080° C., not greater than about 2400° C. not greater than about 2300° C., not greater than about 2200° C. not greater than about 2180° C.

Item 20. The method of Item 1, wherein sintering includes holding the sintering temperature for a duration of at least about 30 minutes, at least about 60 minutes, at least about 90 minutes, at least about 120 minutes, at least about 150 minutes, and not greater than about 6 hours, not greater than about 4 hours, not greater than about 3 hours.

Item 21. The method of Item 1, wherein sintering is conducted in an inert atmosphere, wherein sintering is conducted in an atmosphere including a noble gas, wherein sintering is conducted in an atmosphere including a majority content of argon, wherein sintering is conducted in an atmosphere consisting essentially of argon.

Item 22. The method of Item 1, wherein sintering is conducted in an atmosphere having a pressure of at least about 0.1 psi and not greater than about 10 psi.

Item 23. The method of Item 1, wherein sintering forms a ceramic body having a porosity of not greater than about 10 vol % for the total volume of the ceramic body, not greater than about 8 vol %, not greater than about 5 vol %, not greater than about 4 vol %, not greater than about 3 vol %, not greater than about 2 vol %, not greater than about 1 vol %, and at least about 0.1 vol %.

Item 24. The method of Item 1, wherein the ceramic body includes a sintered silicon carbide body.

Item 25. The method of Item 1, wherein the first type of grain has an average grain size of not greater than about 7 times the first average particle size (PS1), not greater than about 6 times the first average particle size, not greater than about 5 times the first average particle size (PS1), not greater than about 4 times the first average particle size, and at least about 1.1 times the first average particle size, at least about 1.3 times the first average particle size, at least about 1.5 times the first average particle size.

Item 26. The method of Item 1, wherein the first type of grain is present in a majority content within the ceramic body, wherein the ceramic body includes at least about 52 vol % of the first type of grain for the total volume of the ceramic body, at least about 55 vol %, at least about 58 vol %, at least about 62 vol %, at least about 65 vol %, at least about 68 vol %, at least about 72 vol %, at least about 75 vol %, and not greater than about 95 vol %, not greater than about 92 vol %, not greater than about 88 vol %, not greater than about 85 vol %, not greater than about 82 vol %, not greater than about 78 vol %.

Item 27. The method of Item 1, wherein the first type of grain includes an average aspect ratio of not greater than about 1.4 wherein aspect ratio is a measure of length to width, wherein length is the longest dimension of a grain as viewed in two-dimensions and width is the shortest dimension of the grain as measured in two-dimensions in a direction perpendicular to a direction defined by the length, wherein the aspect ratio is not greater than about 1.2, wherein the aspect ratio is not less than about 0.8, wherein the first type of grain is essentially equiaxed.

Item 28. The method of Item 1, wherein the first type of grain includes an average grain size of at least about 1 micron, at least about 2 microns, at least about 3 microns, and not greater than about 15 microns, not greater than about 12 microns, not greater than about 10 microns, not greater than about 8 microns, not greater than about 6 microns.

Item 29. The method of Item 1, wherein the first type of grain includes a carbide, wherein the first type of grain includes silicon carbide, wherein the first type of grain consists essentially of silicon carbide.

Item 30. The method of Item 1, further including a second type of grain is dispersed within the ceramic body, wherein the second type of grain is substantially homogeneously dispersed between the first type of grain, wherein the second type of grain includes a carbide, wherein the second type of grain includes silicon carbide, wherein the first type of grain consists essentially of silicon carbide and aluminum.

Item 31. The method of Item 30, wherein the second type of grain includes an aluminum content of at least about 500 ppm, at least about 600 ppm, at least about 700 ppm, and not greater than about 3000 ppm.

Item 32. The method of Item 30, wherein the second type of grain includes an aluminum content greater than the first type of grain, wherein the aluminum is dispersed intragranularly within the second type of grain.

Item 33. The method of Item 30, wherein the second type of grain is present in a minority content, based on a statistical average of the total number of grains in the ceramic body, wherein the ceramic body includes not greater than about 48 vol % of the second type of grain for the total volume of the ceramic body, not greater than about 46 vol %, not greater than about 42 vol %, not greater than about 40 vol %, not greater than about 38 vol %, and at least about 10 vol %, at least about 14 vol %, at least about 18 vol %, at least about 20 vol %, at least about 22 vol %, at least about 25 vol %, at least about 28 vol %, at least about 30 vol %.

Item 34. The method of Item 30, wherein the second type of grain has an average grain size of not greater than about 1000 times the second average particle size (PS2), not greater than about 800 times the second average particle size, not greater than about 600 times the second average particle size, not greater than about 400 times the second average particle size, not greater than about 300 times the second average particle size, not greater than about 200 times the second average particle size, and at least about 1.1 times the second average particle size.

Item 35. The method of Item 30, wherein the second type of grain is acicular, wherein the second type of grain includes an average aspect ratio of at least about 1.4, wherein aspect ratio is a measure of length to width, wherein length is the longest dimension of the second type of grain as viewed in two-dimensions and width is the shortest dimension of the second type of grain as measured in two-dimensions in a direction perpendicular to a direction defined by the length, wherein the aspect ratio is at least about 1.8, at least about 2, at least about 3, at least about 4, at least about 10, and not greater than about 100.

Item 36. The method of Item 30, wherein the second type of grain has an average grain size (GS2) greater than an average grain size (GS1) of the first type of grain, wherein the wherein the second average grain size at least about 5% greater than the first average grain size based on the equation $((GS2-GS1)/GS2) \times 100\%$, at least about 10% greater, at least about 15% greater, at least about 20% greater, at least about 25% greater, at least about 30% greater, at least about 35% greater, at least about 40% greater, at least about 45% greater, at least about 50% greater, and not greater than about 95%, not greater than about 90%, not greater than about 85%, not greater than about 80%, not greater than about 75%, not greater than about 70%.

Item 37. The method of Item 30, wherein the second type of grain has an average grain size of at least about 10 microns, at least about 20 microns, at least about 40 microns, at least about 60 microns, at least about 80 microns, or even at least about 100 microns, and not greater than about 1000 microns, not greater than about 800 microns, not greater than about 600 microns, not greater than about 400 microns.

Item 38. The method of Item 1, wherein the first type of grain includes a carbide, wherein the first type of grain includes silicon carbide, wherein the first type of grain consists essentially of silicon carbide.

Item 39. The method of Item 1, wherein the ceramic body is essentially free of silicon metal, wherein the ceramic body is essentially free of aluminum nitride, wherein the body is essentially free of an oxide material, wherein the body is essentially free of a nitride material, wherein the body is essentially free of a boride material.

Item 40. The method of Item 1, wherein the ceramic body is polycrystalline, wherein the ceramic body consists essentially of the first type of grain and a second type of grain.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of forming a silicon carbide body comprising:
   forming a mixture comprising:
      a first powder material (PM1) comprising carbon having a first average particle size (PS1); and
      a second powder material (PM2) comprising carbon and different than the first powder material, wherein the second powder material has a second average particle size (PS2) less than the first average particle size (PS1), and wherein the second powder material has an aluminum content (AC2) greater than an aluminum content (AC1) of the first powder material;
   forming a green body from the mixture; and
   sintering the green body and forming the silicon carbide body comprising:
      a first type of grain having a first average grain size of not greater than about 8 times the first average particle size (PS1); and
      a second type of grain having a second average grain size and an elongated structure,
   wherein:
      the silicon carbide body includes an aluminum content of not greater than about 800 ppm, and at least about 100 ppm;
      the silicon carbide body of the armor component comprises a second type grain concentration of not greater than about 34 per $mm^2$, and at least about 4 per $mm^2$; and
      the second average grain size is at least 50 times greater than the first average grain size.

2. The method of claim 1, wherein the first powder material consists essentially of silicon carbide.

3. The method of claim 1, wherein the second powder material consists essentially of silicon carbide black.

4. The method of claim 1, wherein the mixture comprises a ratio (PM1/PM2) of the content (wt %) of the first powder material to the second powder material of at least about 1.1, and not greater than about 8.

5. The method of claim 1, wherein the mixture comprises a content of the first powder of at least about 10 wt % for the total weight of the mixture, and not greater than about 90 wt %.

6. The method of claim 1, wherein the mixture comprises a content of the second powder of at least about 10 wt % for the total weight of the mixture, at least about 15 wt %, and not greater than about 50 wt %.

7. The method of claim 1, wherein the second powder material comprises an aluminum content (AC2) of at least about 5% greater than the aluminum content (AC1) of the first powder material based on the equation $((AC2-AC1)/AC2) \times 100\%$, and not greater than about 95%.

8. The method of claim 1, wherein the aluminum content of the first powder material is less than about 800 ppm, and at least about 10 ppm.

9. The method of claim 1, wherein the aluminum content of the second powder material is at least about 900 ppm, and not greater than about 3000 ppm.

10. The method of claim 1, wherein forming comprises a shaping process selected from the group consisting of pressing, extruding, casting, punching, slip casting, and a combination thereof; wherein sintering is conducted at a sintering temperature of at least about 1600° C., and not greater than about 2200° C.; and wherein sintering comprises holding the sintering temperature for a duration of at least about 30 minutes, and not greater than about 6 hours.

11. An armor component, comprising:
   a silicon carbide body including:
      a first type of grain having a first average grain size, and a second type of grain having a second average grain size and an elongated structure,
   wherein:
      the silicon carbide body of the armor component includes an aluminum content of not greater than about 800 ppm, and at least about 100 ppm;
      the silicon body comprises a second type grain concentration of not greater than about 34 per $mm^2$, and at least about 4 per $mm^2$; and
      the second average grain size is at least 50 times greater than the first average grain size.

12. The armor component of claim 11, wherein the second type of grain is present in a minority content, based on a statistical average of the total number of grains in the silicon carbide body, and at least about 10%.

13. The armor component of claim 11, wherein the first type of grain consists essentially of silicon carbide.

14. The armor component of claim 11, wherein the silicon carbide body is essentially free of a material selected from the group consisting of silicon metal, aluminum nitride, an oxide material, a nitride material, a boride material, and a combination thereof.

15. The armor component of claim 11, wherein the second type of grain has an average grain size of not greater than about 1000 times an average grain size of the first type of grain.

16. The armor component of claim 11, wherein the second type of grain comprises an average aspect ratio of at least about 1.4, and not greater than about 100, wherein aspect ratio is a measure of length to width, wherein length is the longest dimension of the second type of grain as viewed in two-dimensions and width is the shortest dimension of the second type of grain as measured in two-dimensions in a direction perpendicular to a direction defined by the length.

17. The armor component of claim 11, wherein the second type of grain consists essentially of silicon carbide.

18. An armor component, comprising
a silicon carbide body including:
a first type of grain having a first average grain size; and
a second type of grain having a second average grain size and an elongated structure,
wherein:
the silicon carbide body of the armor component includes an aluminum content of not greater than about 800 ppm, and at least about 100 ppm;
within silicon carbide body, a ratio of a content of the first type of grain to the second type of grain is not greater than about 3.5 and at least about 0.5,
the silicon carbide body includes:
at least about 30 wt % of grains having a 4H polytype, and not greater than about 50 wt % of grains having 4H polytype; or
at least about 48 wt % of grains having a 6H polytype, and not greater than about 67 wt % of grains having a 6H polytype.

19. The armor component of claim 18, wherein the silicon carbide body includes at least 30 wt % of grains having a 4H polytype, and not greater than about 50 wt % of grains having a 4H polytype.

20. The armor component of claim 18, wherein the silicon carbide body includes at least about 48 wt % of grains having a 6H polytype, and not greater than about 67 wt % of grains having a 6H polytype.

\* \* \* \* \*